(12) United States Patent
Dunstan et al.

(10) Patent No.: US 9,839,844 B2
(45) Date of Patent: Dec. 12, 2017

(54) SPRITE STRIP RENDERER

(75) Inventors: Jackson Dunstan, Sherman Oaks, CA (US); Robert Todd Ogrin, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 653 days.

(21) Appl. No.: 13/156,945

(22) Filed: Jun. 9, 2011

(65) Prior Publication Data

US 2012/0223940 A1 Sep. 6, 2012

Related U.S. Application Data

(60) Provisional application No. 61/448,155, filed on Mar. 1, 2011.

(51) Int. Cl.
| | | |
|---|---|---|
| *G06T 15/00* | (2011.01) | |
| *G06T 13/80* | (2011.01) | |
| *A63F 13/355* | (2014.01) | |
| *A63F 13/52* | (2014.01) | |
| *G06T 15/20* | (2011.01) | |

(52) U.S. Cl.
CPC ............ *A63F 13/355* (2014.09); *A63F 13/52* (2014.09); *G06T 13/80* (2013.01); *G06T 15/20* (2013.01); *A63F 2300/538* (2013.01); *A63F 2300/5553* (2013.01); *A63F 2300/6607* (2013.01); *G06T 2200/16* (2013.01)

(58) Field of Classification Search
CPC ..... G06T 19/00; G06T 19/003; G06T 19/006; G06T 17/20; G06T 17/205; G06T 2210/16; G06T 13/40; H04N 13/0048; A61B 5/0095; A63F 13/12; A63F 2300/407; A63F 2300/534; A63F 2300/408; G02B 27/283; G09G 3/346; G06K 9/00208
USPC ........................................................ 345/419
See application file for complete search history.

(56) References Cited

U.S. PATENT DOCUMENTS

| | | | |
|---|---|---|---|
| 2007/0002057 A1* | 1/2007 | Danzig et al. | ................ 345/473 |
| 2009/0079743 A1* | 3/2009 | Pearson et al. | ................ 345/473 |
| 2010/0032137 A1 | 2/2010 | Huang et al. | |
| 2010/0229108 A1 | 9/2010 | Gerson et al. | |
| 2011/0227938 A1 | 9/2011 | Lan et al. | |
| 2012/0188233 A1* | 7/2012 | Shuster et al. | ................ 345/419 |

FOREIGN PATENT DOCUMENTS

| | | |
|---|---|---|
| EP | 2184092 A2 | 5/2010 |
| EP | 2527019 A2 | 11/2012 |
| JP | 2001079260 A | 3/2001 |

(Continued)

OTHER PUBLICATIONS

Abstract of Korean Patent Application KR20120020789 Feb. 29, 2012, entitled Sprite Strip Renderer, filed Feb. 29, 2012.

*Primary Examiner* — Gregory J Tryder
*Assistant Examiner* — Kwang Lee
(74) *Attorney, Agent, or Firm* — Patterson + Sheridan, LLP

(57) ABSTRACT

Techniques are disclosed for generating 2D images of a 3D avatar in a virtual world. In one embodiment, a request is received specifying customizations to the 3D avatar. The 2D images are generated based on the request, each 2D image representing the 3D avatar from a different viewing angle in the virtual world. Advantageously, the 2D images may be sent to a client for display, without requiring the client to render the 3D avatar.

13 Claims, 8 Drawing Sheets

(56) References Cited

FOREIGN PATENT DOCUMENTS

| | | |
|---|---|---|
| KR | 1020100079486 | 7/2010 |
| WO | 2008130337 | 10/2008 |
| WO | 2008130337 E1 | 10/2008 |

* cited by examiner

| HAT IDENTIFIER | DESCRIPTION | PREVIEW |
|---|---|---|
| 01 | HEADBAND | |
| 02 | BASEBALL CAP | |
| 03 | TOP HAT | |

FIG. 2A

| CLOTHING IDENTIFIER | DESCRIPTION | PREVIEW |
|---|---|---|
| 01 | OVERALLS | |
| 02 | T-SHIRT | |
| 03 | CLOAK | |

FIG. 2B

| AVATAR CUSTOMIZATIONS | | |
|---|---|---|
| AVATAR ID | 101 | 302 |
| AVATAR NAME | BOB | 304 |
| HAT IDENTIFIER | 03 | 306 |
| CLOTHING IDENTIFIER | 03 | 308 |

152

| SPRITE STRIP | | | | |
|---|---|---|---|---|
| VIEW ANGLE | 0° | 90° | 180° | 270° |
| TWO-DIMENSIONAL IMAGE | | | | |
| 504 | 504₁ | 504₂ | 504₃ | 504₄ |

156

502

SPRITE STRIP RENDERER

CROSS-REFERENCE TO RELATED APPLICATIONS

This application claims benefit of U.S. provisional patent application Ser. No. 61/448,155, filed on Mar. 1, 2011, which is incorporated herein by reference in its entirety.

BACKGROUND

Field

Embodiments of the invention relate generally to computer games and, more particularly, to generating images for an avatar in a virtual world.

Description of the Related Art

In-home computer games and computer game systems have become mainstream consumer products. Such systems allow a user to play computer games at home on a standard television set or on a handheld device that the user may carry with the user. Typically, in-home computer game systems include a console that reads computer game code from a storage device (e.g., a CD-ROM disc or cartridge) and transmits video to a television screen for display. Computer game systems also typically include a controller device that allows the user playing the computer game to provide inputs to the computer game to manipulate the characters or other features of the game.

Generally, the designer of the computer game will create a computer-rendered world in which the computer game characters or other features may interact. For example, many computer games allow a player to maneuver an avatar (e.g., a sprite or character) through a computer-rendered world to accomplish a set of tasks. Other computer games allow the player to control a vehicle or airplane through a computer-rendered world. In two-dimensional computer games, characters may move in two dimensions (e.g., up and down on the screen or left and right), while in three-dimensional computer games, characters are typically allowed to move in three dimensions in the computer-rendered world.

SUMMARY

Embodiments of the invention provide a computer-implemented method, computer program product and system for performing an operation that includes receiving, from a client, a first request specifying customizations to a first 3D avatar in a virtual world. The operation also includes generating a plurality of 2D images of the first 3D avatar, the first 3D avatar being rendered using the specified customizations, each 2D image representing the first 3D avatar from a respective different viewing angle. The operation also includes sending the plurality of 2D images to the client for display.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-2B illustrate ways in which a three-dimensional avatar may be customized, according to one embodiment of the invention.

DETAILED DESCRIPTION

Figure 1:
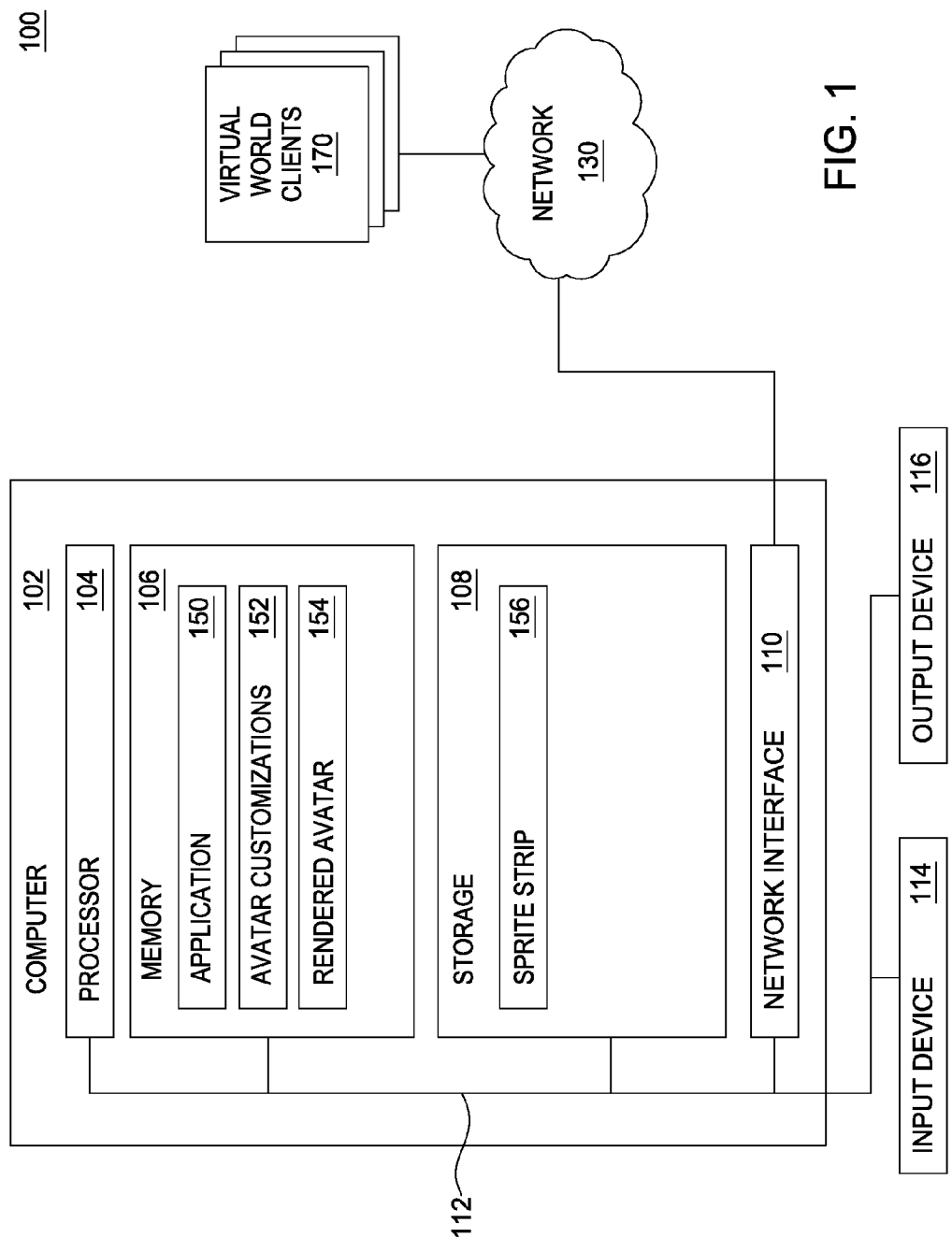
FIG. 1 is a block diagram illustrating a system for generating a sprite strip for a three-dimensional avatar in a virtual world, according to one embodiment of the invention.

Embodiments of the invention generally provide techniques for generating two-dimensional images for a three-dimensional avatar in a virtual world. One embodiment provides a computer game that includes a virtual world server application (or application) and multiple virtual world client applications (or clients). The application receives, from a first client, a first request specifying customizations to the three-dimensional avatar in the virtual world, which includes an environment. The application generates a sprite strip based on the specified customizations. Generating the sprite strip may include rendering the avatar using the specified customizations and generating multiple two-dimensional images of the rendered avatar from multiple viewing angles. The two-dimensional images may also be referred to as 2D views. The application sends the sprite strip to the first client for display. The first client may output the avatar for display using one or more images selected from the sprite strip. Advantageously, the first client may output the avatar without having to render the avatar, thereby reducing a client processing cost associated with the first client performing rendering of the avatar. Of course, other clients may render the avatar directly, rather than requesting the application for a sprite strip. However, outputting the avatar based on the sprite strip may be more efficient than rendering the avatar at least in some cases. The decision of whether the first client should render the avatar or request a sprite strip can be made by developers and/or users of the computer game to suit the needs of a particular case, e.g., to balance competing objectives of realism and high frame rate.

Depending on the embodiment, each image in the sprite strip may be represented as an array of pixels or as a geometric description. An image that is stored as an array of pixels may be referred to as a raster graphics image or bitmap. An image that is stored as a geometric description may be referred to as a vector graphics image. That is, a given image in the sprite strip may be, in a first instance, a raster graphics image or, in a second instance, a vector graphics image. The geometric description may specify, in the form of mathematical equations, one or more geometrical primitives such as points, lines, curves, shapes, and/or polygons. Client-side outputting of the bitmaps and/or client-side rendering of the (two-dimensional) vector graphics images may be more efficient than client-side rendering of the three-dimensional avatar at least in some cases.

In one embodiment, the application may also cache generated sprite strips in a data structure. The application may subsequently receive, from a second client, a request specifying customizations to a second avatar in the virtual world. Upon determining that the specified customizations correspond to the cached sprite strip, the application sends the sprite strip to the second client. Accordingly, the second client may output the second avatar for display, without the server or the second client having to render or re-render the second avatar. Further, in some embodiments, a given client may specify one or more sprite strip options. The sprite strip options may include a desired resolution of the images, a desired compression quality for the images, a desired count of images to be included in the sprite strip, and one or more desired viewing angles of the avatar from which to generate the images.

In one embodiment, the sprite strip options may be user-configurable and/or determined by the client programmatically without user input and based on system specifications and/or system metrics of a computer on which the client executes; for example, the sprite strip options may be user-configurable in a third instance and determined by the client in a fourth instance. Such determination by the client programmatically without user input may also be referred to as automatic determination by the client. The client may compute an indicator of system metrics based on information regarding system specifications of the computer and/or based on results of executing one or more benchmarking applications on the computer. A benchmarking application is configured to assess one or more capabilities of a computer system using one or more predefined tests. In an alternative embodiment, the system metrics may include a frame rate at which the computer is executing the client. The client may send the sprite strip options to the application to customize the generation of sprite strips. The sprite strip options may also be dynamically set or altered by the client based on real-time system metrics of the client, programmatically without user input; such programmatic alternation by the client without user input may also be referred to as automatic alteration by the client. For example, if the frame rate of the client drops below a specified threshold, the client may request the server to send sprite strip images of a lower resolution and/or a reduced number of sprite strip images; in a particular embodiment, the specified threshold is a minimum predefined threshold of system metrics. Doing so may allow the client to subsequently execute at a higher frame rate. Accordingly, the process of outputting the avatar for display may be tailored to suit the needs of the system specifications of the computer, to provide a smoother, more compelling user experience in the virtual world. For example, the client application may support a broader range of client system specifications using the techniques disclosed herein. The client application may also support a higher frame rate and/or operative with a heightened level of responsiveness at least in some cases. Advantageously, user satisfaction with the computer game may be improved.

Reference is made herein to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for generating a sprite strip for a three-dimensional avatar in a virtual world, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 152. Examples of operating systems 152 include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard and/or mouse may be used. The output device 116 may be any device for providing output to a user of the computer 102. For example, the output device 116 may be any conventional display screen or set of speakers, along with their respective interface cards. Although shown separately from the input device 114, the output device 116 and input device 114 may be combined. For example, a display screen with an integrated touch-screen may be used.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a computer game) or related data available in the cloud. For example, the computer game described herein could execute on a computing system in the cloud, thereby allowing users to access the game from any computing system attached to a network connected to the cloud (e.g., the Internet). Similarly, the sprite strips described herein could be cached in the cloud and used to service subsequent client requests.

As shown, the memory 106 of the computer 102 includes an application 150, avatar customizations 152, and a rendered avatar 154. The storage 108 of the computer 102 includes a sprite strip 156. In one embodiment, the application 150 is a virtual world server application configured to communicate with one or more virtual world client applications 170 (or clients) to provide a virtual world of a computer game. Each virtual world client application 170 may execute on a respective computer connected to the computer 102 via the network 130. In one embodiment, the computer game may be of one or more of the following genres: action, adventure, arcade, role-playing, simulation, sports, racing, fighting, shooting, shooter, strategy, and puzzle. Additionally, the computer game may also be a massively multiplayer online role-playing game (MMORPG). In one embodiment, the racing genre of computer games refers to any game for which a primary game objective is to race along a race course, either against the clock or against other computer- or player-controlled characters. The racing may occur over land, sea, and/or air, and may involve appropriate vehicles. Further, the racing may occur from a first- or third-person perspective for the player.

In one embodiment, each avatar may be controlled player-controlled or computer-controlled. The avatar may refer to any visual object in the computer game which movement and/or actions may be controlled directly by a player or a computer (instead of indirectly through controlling another visual object in the computer game). For example, the avatar may be a player character, a player vehicle, or any other character or object which role the player or computer assumes over a course of playing the computer game (e.g., a monster or a villain). The avatar may also be a non-player character (NPC) in the computer game. Further, each avatar may include one or more customizable properties. Each property affects the visual appearance of the avatar. For example, if the avatar represents a human being, the properties may include face shape, skin color, hair color, eyebrow type, nose type, avatar height, body size, etc. The properties may also include any clothing or accessories being worn by the avatar, such as a hat, a coat, shoes, jewelry, etc. If the avatar represents a motor vehicle, the properties may include an exterior color, interior color, body style, wheel type, etc. In some embodiments, a player is only allowed to customize an avatar at a time of creating the avatar. In other embodiments, a player is also allowed to customize one or more properties of the avatar subsequent to creating the avatar.

In one embodiment, the application 150 receives, from a client 170, a request specifying customizations made to a three-dimensional avatar in the virtual world. The three-dimensional avatar may be an avatar of a player using the client 170, an avatar of a different player, or a computer-controlled avatar. The specified customizations are referred to herein as the avatar customizations 152. In one embodiment, the avatar customizations 152 fully define a visual appearance of the avatar in the virtual world. In response to the request, the application 150 generates the sprite strip 156 based on the avatar customizations 152.

In one embodiment, to generate the sprite strip 156, the application 150 may render the three-dimensional avatar and generate multiple images of the rendered avatar, each image corresponding to a different viewing angle of the rendered avatar. The generated sprite strip includes the multiple images. As used herein, an image refers to a spatially mapped array of bits for storing digital images. In this regard, each image may be considered to represent a sprite, which refers to a two-dimensional digital image configured to be integrated into a larger scene, such as a scene in the virtual world. The application 150 sends the sprite strip to the client, which outputs one or more of the images for display in a scene of the virtual world, based on a viewing angle of the avatar as required by the scene, thereby applying the techniques disclosed herein to the avatar and not to the scene itself. In other words, in one embodiment, sprite strip rendering is used for avatar rendering and not for environment rendering. Accordingly, the client may display the avatar using only a single network roundtrip and without having to render the avatar, which may improve performance of the client. In particular, the performance of the client may be improved in terms of reduced latency and/or decreased processing overhead, relative to alternative embodiments.

For example, an alternative embodiment may require two or more network roundtrips between the client and the application—e.g., the application first responding to a client request with a location indicator (such as a uniform resource locator (URL)) associated with a single image and the client then retrieving the single image based on a location indicator. Having two or more network roundtrips for retrieving an image may create undesirable visual artifacts at least in some cases. An example of an undesirable visual artifact is a "popping in" effect characterized by the sudden appearance of avatars in a scene subsequent to the scene being displayed. The undesirable visual artifacts may be reduced by not requiring any location indicator to be exchanged between the application 150 and the client 170. Advantageously, by using the techniques herein to display a player avatar, avatars of other players, and/or computer-controlled avatars, performance of the client may improve significantly at least in some cases.

FIGS. 2A-2B illustrate ways in which a three-dimensional avatar may be customized, according to one embodiment of the invention. An avatar so customized may also be referred to as a customized 3D avatar. Assume that the avatar being customized represents a human being. As shown in FIG. 2A, the computer game 150 may provide multiple hats 202 that are selectable by the player to be worn by the avatar in the virtual world. Each hat may be associated with a respective identifier 204 and description 206. Further a preview 208 of the respective hat is shown for illustrative purposes. The hats include a headband having a hat identifier of "01", a baseball cap having a hat identifier of "02", and a top hat having a hat identifier of "03".

Continuing the above example, as shown in FIG. 2B, the computer game 150 may also provide multiple types of clothing 210 that are selectable by the player to be worn by the avatar in the virtual world. Each type of clothing may be associated with a respective clothing identifier 212 and description 214. Further, a preview 216 of the respective type of clothing is shown for illustrative purposes. The types of clothing 210 include a pair of overalls having a clothing identifier of "01", a t-shirt having a clothing identifier of "02", and a cloak having a clothing identifier of "03".

Assume that each avatar in the virtual world has a visual appearance that is fully defined by the hat and the clothing worn by the respective avatar. Put another way, assume that players of the virtual world are only allowed to customize the hat and clothing worn by their avatars. In one embodiment, to display an avatar without having to render the avatar, the client 170 sends a request to the application 150, the request including the customizations previously made to the avatar. The customizations may be made by any player or defined by an administrative user, such as content creator for the virtual world (e.g., for an NPC).

Figures 3, 4, 5:
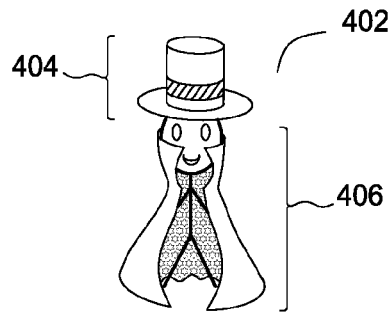
FIG. 3 illustrates avatar customizations sent to a virtual world server application, according to one embodiment of the invention.
FIG. 4 illustrates a three-dimensional avatar rendered by the application, according to one embodiment of the invention.
FIG. 5 illustrates a sprite strip generated by the application, according to one embodiment of the invention.

FIG. 3 illustrates the avatar customizations 152 sent to the application 150, according to one embodiment of the invention. As shown, the avatar customizations 152 identifies an avatar to be displayed, via an avatar identifier 302. Further, although not required to be included in the request, a name 304 of the avatar is shown for illustrative purposes. The avatar customizations 152 associate the avatar identifier 302 with a respective hat identifier 306 and clothing identifier 308. In this particular example, the avatar customizations 152 indicate to the application 150 that the client 170 desires to display an avatar named Bob and having an avatar identifier of "101". The avatar customizations 152 further indicate to the application 150 that the avatar may be characterized as wearing a top hat and a cloak—as given by the hat identifier of "03" and the clothing identifier of "03". In response to receiving the request, the application 150 renders the three-dimensional avatar based on the avatar customizations 152.

FIG. 4 illustrates a three-dimensional avatar 402 rendered by the application 150 of FIG. 1, according to one embodiment of the invention. As shown, the three-dimensional avatar 402 is wearing a top hat 404 and a cloak 406, as specified by the avatar customizations 152 received from the client 170. In one embodiment, after rendering the three-dimensional avatar 402, the application 150 generates multiple two-dimensional images from the rendered avatar, each two-dimensional image corresponding to a different viewing angle of the rendered avatar. The generated two-dimensional images may be combined to form a sprite strip 156. Depending on the embodiment, the corresponding viewing angles may also be stored in the sprite strip. In an alternative embodiment, instead of storing the corresponding viewing angles in the sprite strip, the two-dimensional images may be stored in a predefined order in the sprite strip, each position in the order being associated with a predefined viewing angle.

FIG. 5 illustrates a sprite strip 156 generated by the application 150 of FIG. 1, according to one embodiment of the invention. As shown, the sprite strip 156 includes multiple two-dimensional images 504, each having an associated viewing angle 502. In this particular example, the sprite strip 156 includes four images, representing a front view, a back view, and two side views of the avatar. Of course, any number of viewing angles may be supported by the application 150. For example, in an alternative embodiment, the application 150 supports a total of thirty-six viewing angles of an avatar, each viewing angle separated by ten degrees. In another embodiment, the application 150 supports a total of sixteen viewing angles of an avatar, each viewing angle separated by 22.5 degrees. In some embodiments, the number of viewing angles may be determined by a developer of the application 150 to improve performance of the application 150 and/or clients 170. In still other embodiments, the number of viewing angles may be customized by a player using the client 170.

In one embodiment, the viewing angles 502 may be characterized as a count of degrees or radians in which to rotate an axis of a predefined orientation of the avatar. The axis of rotation and the direction of rotation may also be predefined. For example, if the predefined orientation of the avatar is a front view of the avatar, then a viewing angle of "90 degrees" may refer to an orientation of the avatar, that is obtained from rotating the avatar (in a front-view orientation) counter-clockwise by 90 degrees along an upward-pointing axis in a three-dimensional Cartesian coordinate system. Depending on the embodiment, the upward-pointing axis may be regarded as the y-axis, the z-axis, the x-axis, etc. Similarly, the back view of the avatar may be obtained by rotating the avatar (in a front-view orientation) counter-clockwise by 180 degrees along the upward-pointing axis. Of course, rotations along other axes are broadly contemplated. For example, in some embodiments, the sprite strip may include a two-dimensional image representing a top view or bird's-eye view of the three-dimensional avatar. In general, any orientation of the avatar is supported by the techniques disclosed herein. Further, the sprite strip may also include an indication of the avatar from which the two-dimensional images are generated (e.g., the avatar ID 302 of FIG. 3).

In one embodiment, after generating the sprite strip 156, the application 150 sends the sprite strip 156 to the client 170. The client 170 may select one or more of the two-dimensional images in the sprite strip 156 for display, based on the needs of a scene to be rendered. For example, suppose a player, Alice, is controlling a respective avatar (also named Alice) in the virtual world. Assume that the avatar Alice is speaking with the avatar Bob in the virtual world. Accordingly, the client 170 selects the two-dimensional image $504_1$ corresponding to a front view of the avatar Bob for display to the player Alice. As another example, assume that the avatar Alice is walking behind the avatar Bob in the virtual world. Accordingly, the client 170 selects the two-dimensional image $504_3$ corresponding to a back view of the avatar Bob for display to the player Alice.

More generally, the client 170 may be configured to select different two-dimensional images in the sprite strip 156 for display, as the orientation of the avatar Bob changes over time. The orientation of the avatar Bob may be measured relative to the avatar Alice or relative to any observer viewpoint of the player Alice (such as a viewport). The orientation of the avatar Bob may change as a result of movement of the avatar Bob, movement of the avatar Alice, movement of a viewpoint controlled by the player Alice independent of movement of the avatar Alice, and/or movement of inanimate objects in the scene (e.g., a rotating platform on which Bob is standing). By using the techniques herein to display multiple avatars in a scene, performance of the client may be improved at least in some cases.

Figure 6:
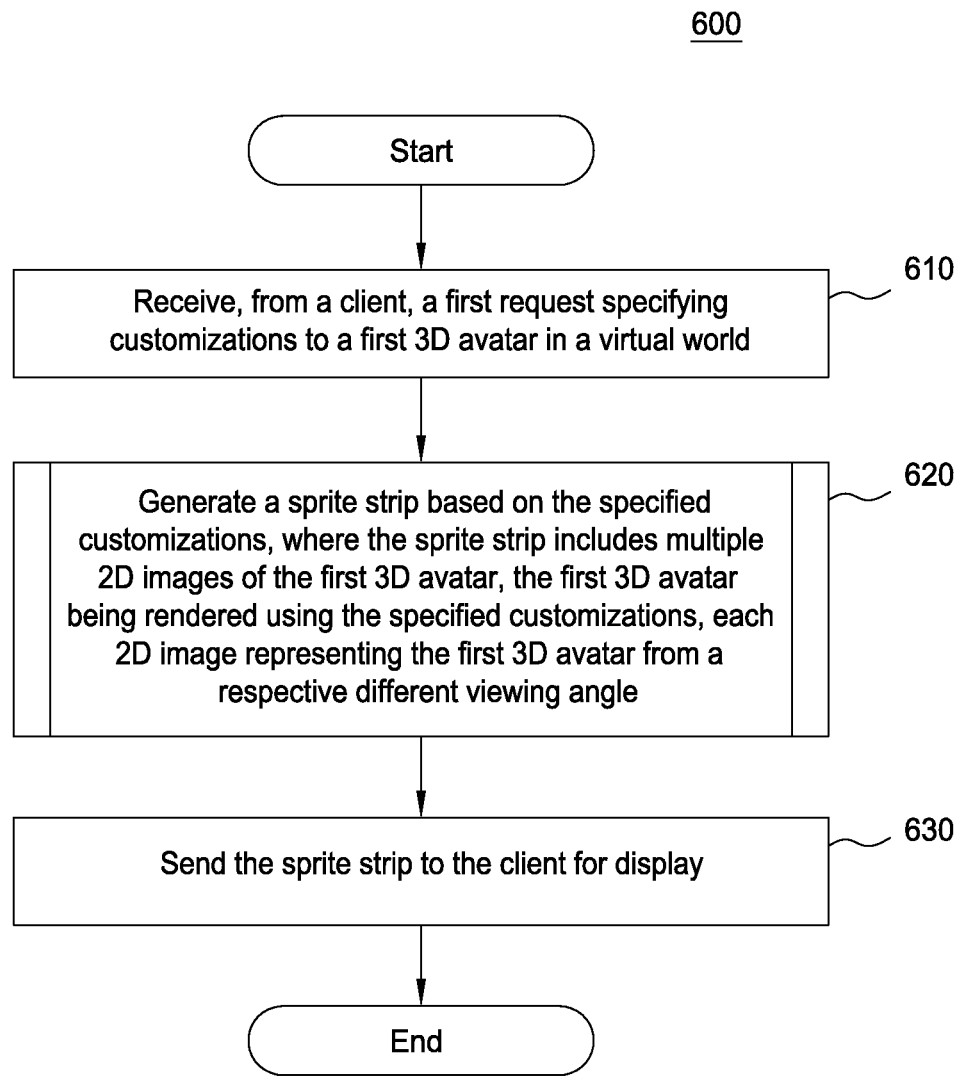
FIG. 6 is a flowchart depicting a method for providing a sprite strip for a three-dimensional avatar, according to one embodiment of the invention.

FIG. 6 is a flowchart depicting a method 600 for providing a sprite strip for a three-dimensional avatar, according to one embodiment of the invention. As shown, the method 600 begins at step 610, where the application 150 receives, from a client 170, a first request specifying customizations to a three-dimensional avatar in the virtual world. At step 620, the application 150 generates a sprite strip based on the specified customizations, where the sprite strip includes multiple two-dimensional images of the three-dimensional avatar. The three-dimensional avatar is rendered using the specified customizations, and each two-dimensional image represents the three-dimensional avatar from a different viewing angle. Step 620 is further described below in conjunction with FIG. 7. At step 630, the application 150 sends the sprite strip to the client 170 for display. After the step 630, the method 600 terminates.

Figure 7:
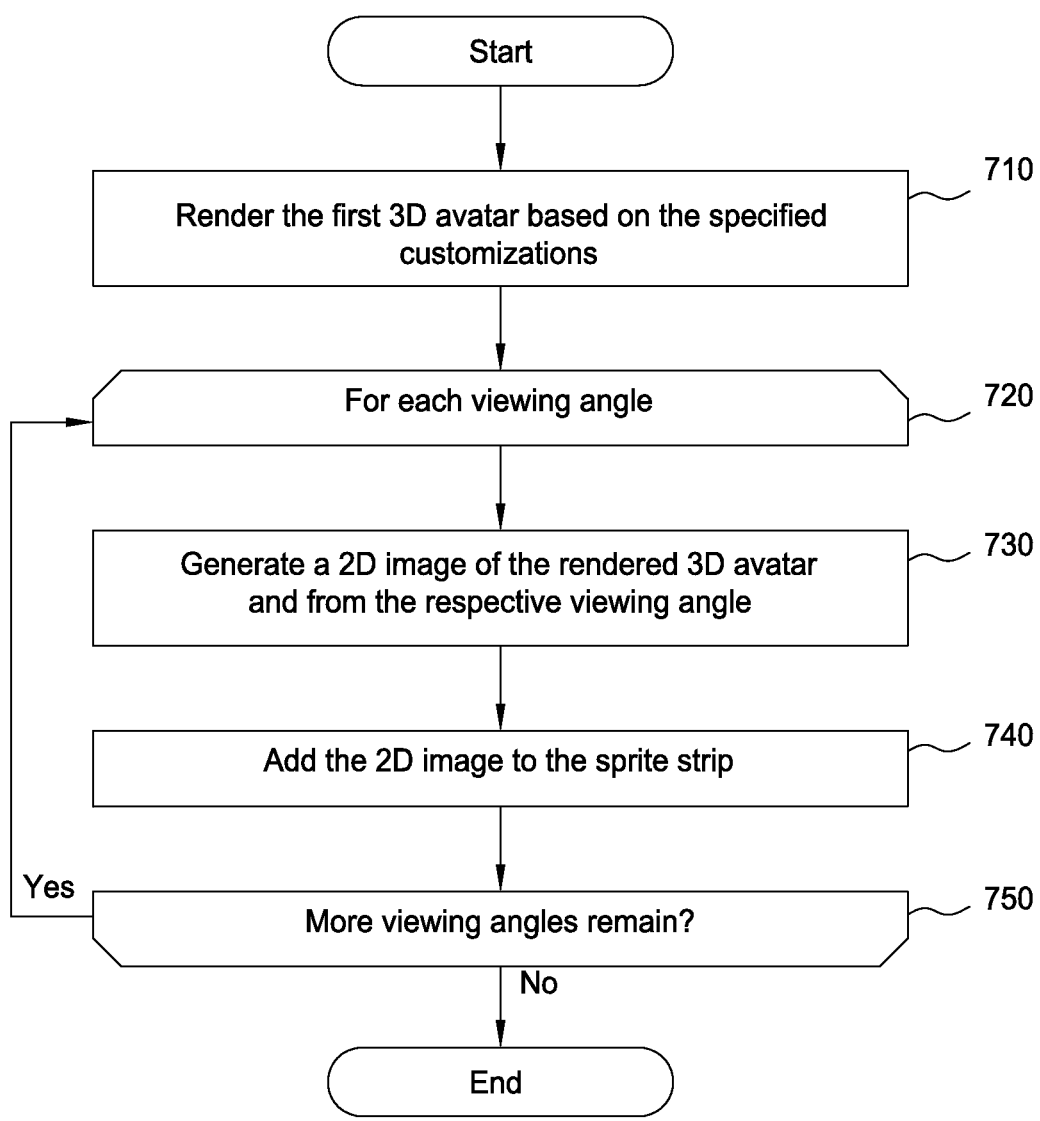
FIG. 7 is a flowchart depicting a method for generating a sprite strip for a three-dimensional avatar, according to one embodiment of the invention.

FIG. 7 is a flowchart depicting a method 700 for generating a sprite strip for a three-dimensional avatar, according to one embodiment of the invention. The method 700 corresponds to the step 620 of FIG. 6. As shown, the method 700 begins at step 710, where the application 150 renders the three-dimensional avatar based on the customizations specified in the request (i.e., the request that is received in the step 610 of FIG. 6). At step 720, the application 150 enters a loop to process each viewing angle to be included in the sprite strip. At step 730, the application 150 generates a two-dimensional image of the rendered three-dimensional avatar and from the respective viewing angle. At step 740, the application 150 adds the generated two-dimensional image to the sprite strip. At step 750, the application 150 determines whether additional viewing angles remain to be processed. If so, the method 700 returns to step 720 for processing a next viewing angle. Otherwise, the method 700 terminates.

Figure 8:
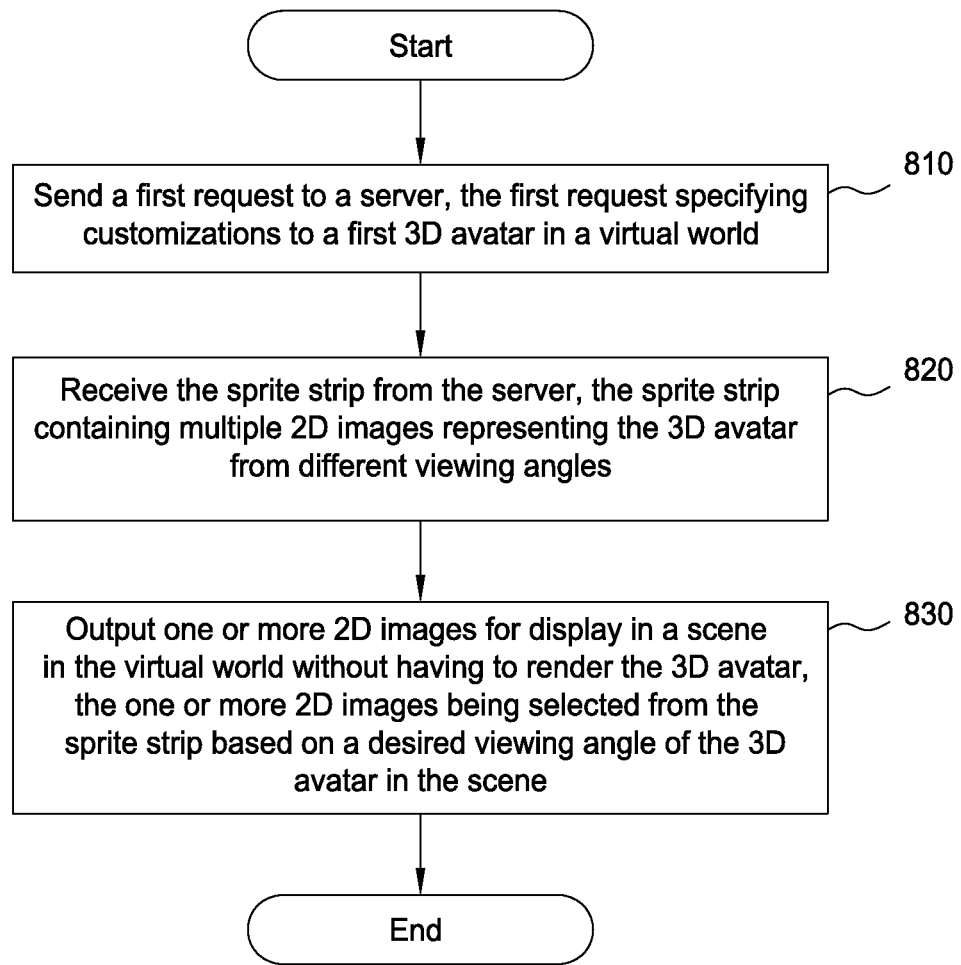
FIG. 8 is a flowchart depicting a method for displaying an avatar without having to render the avatar, according to one embodiment of the invention

FIG. 8 is a flowchart depicting a method 800 for displaying an avatar without having to render the avatar, according to one embodiment of the invention. As shown, the method 800 begins at step 810, where the client 170 sends a request to the application 150, the request specifying customizations to a three-dimensional avatar desired to be displayed. At step 820, the client 170 receives a sprite strip from the application 150, the sprite strip containing multiple two-dimensional images representing the three-dimensional avatar from different viewing angles. At step 830, the client 170 outputs one or more of the two-dimensional images without having to render the three-dimensional avatar. The one or more two-dimensional images may be selected based on a desired viewing angle of the three-dimensional avatar, as dictated by the scene. In so doing, the application 150 may select a two-dimensional image having an associated viewing angle that is closest to the desired viewing angle; in this way, the client 170 may simulate client rendering of the avatar by outputting a server-rendered animation that supports fewer viewing angles than an actual, client-rendered animation of the avatar. For example, continuing the example described above in conjunction with FIG. 5, if the desired viewing angle is ten degrees, then the application 150 may select the two-dimensional image $504_1$. The two-dimensional image $504_1$ is selected because the two-dimensional image $504_1$ represents a rotation of zero degrees from a predefined orientation of the avatar, zero degrees being closest to the desired viewing angle of ten degrees—relative to other two-dimensional images contained in the sprite strip 156. After the step 830, the method 800 terminates.

Figure 9:
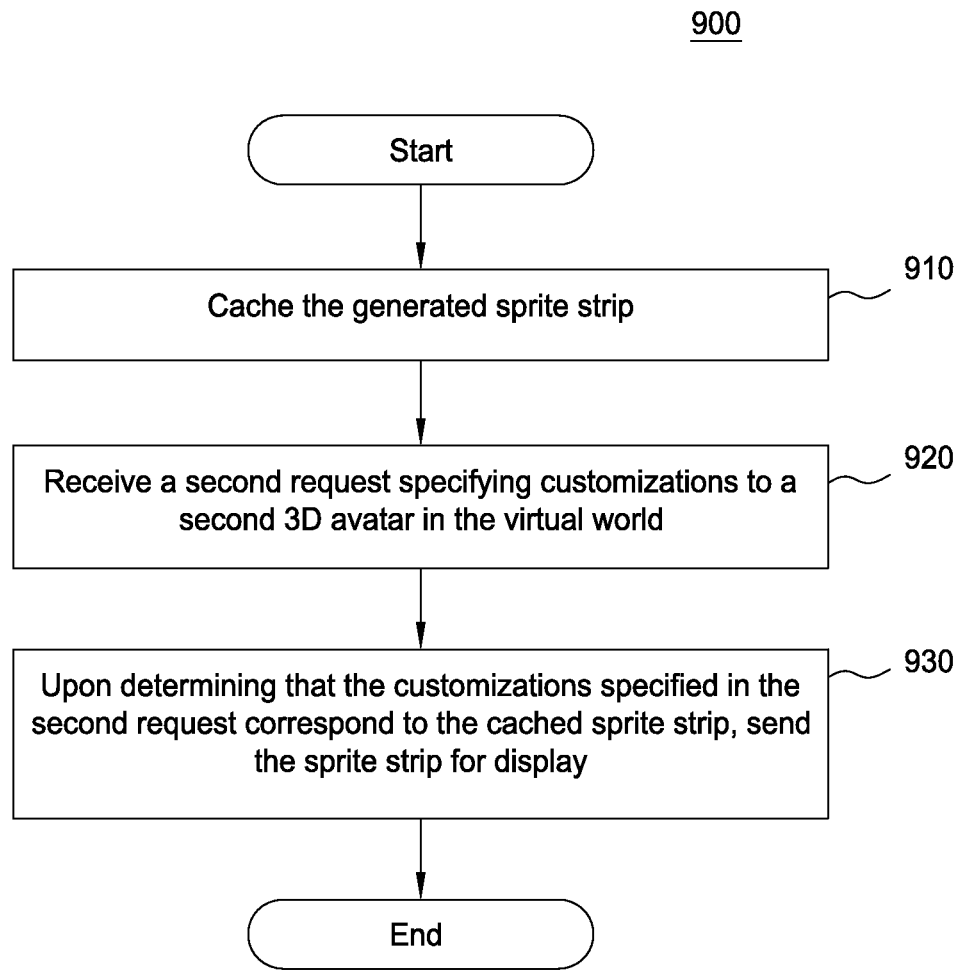
FIG. 9 is a flowchart depicting a method for providing a cached sprite strip for an avatar, according to one embodiment of the invention.

FIG. 9 is a flowchart depicting a method 900 for providing a cached sprite strip for an avatar, according to one embodiment of the invention. As shown, the method 900 begins at step 910, where the application 150 caches a generated sprite strip (e.g., the sprite strip generated at step 620 of FIG. 6). Caching the generated sprite strip may include storing the sprite strip to long-term storage as a data structure. At step 920, the application 150 receives a request from a client, the request specifying customizations to a second avatar in the virtual world. At step 930, the application 150 determines whether the customizations correspond to the cached sprite strip. For example, the application 150 may determine whether the customizations match those customizations from which the cached sprite strip is generated. If so, the application 150 sends the cached sprite strip to the client for display, without having to generate a second sprite strip that is identical to the cached sprite strip. Otherwise, the application 150 generates the sprite strip and sends the sprite strip to the client (e.g., by performing the steps 620 and 630 of FIG. 6). After the step 930, the method 900 terminates. Depending on the embodiment, sprite strips may be cached on a central server or across multiple servers configured to receive and respond to client requests for sprite strips, where each server is also referred to as a view server. The multiple servers, including first and second view servers, may be spread across different geographic regions, and each client may be assigned to a respective one of the multiple servers based on a geographic region associated with the client. Accordingly, the scalability of the virtual world may be improved and the latency of the virtual world may be reduced at least in some cases.

Figure 10:
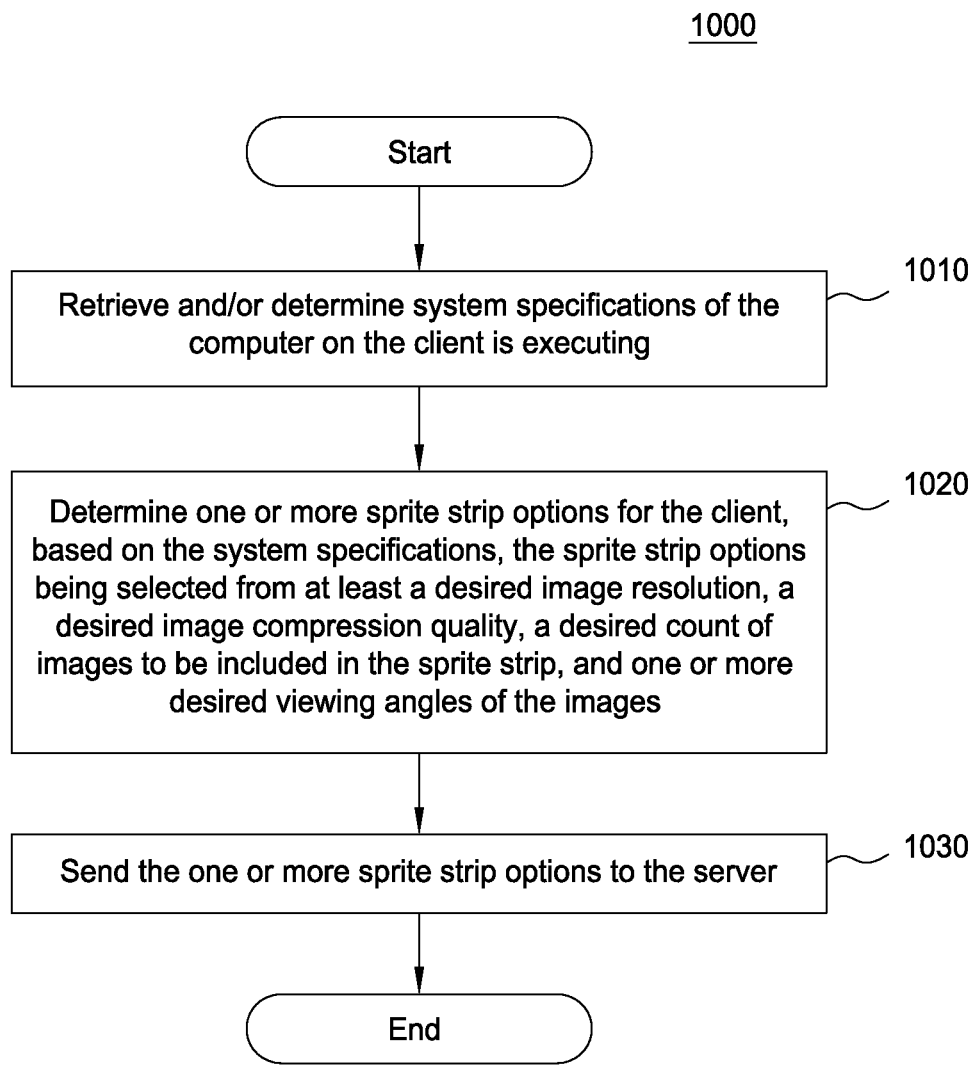
FIG. 10 is a flowchart depicting a method for configuring the application with one or more sprite strip options, according to one embodiment of the invention.

FIG. 10 is a flowchart depicting a method 1000 for configuring the application 150 with one or more sprite strip options, according to one embodiment of the invention. The application 150 may be configured with the sprite strip options to tailor the generation of sprite strips to a particular client 170. As shown, the method 1000 begins at step 1010, where the client 170 retrieves and/or determines system specifications of the computer on which the client 170 is executing. The system specifications may characterize capabilities of the computer in terms of amount and type of system memory, type of graphics card, amount and type of graphics memory, type and speed of processor, etc. The system specifications may also include results of one or more tests executed on the computer to determine the processing capabilities of the computer.

At step 1020, the client 170 determines one or more sprite strip options, based on the system specifications. The sprite strip options may include a desired resolution of two-dimensional images generated by the application 150, a desired compression quality of two-dimensional images generated by the application 150 (e.g., for lossy image compression formats), a desired count of two-dimensional images to be included the sprite strip generated by the application 150, and/or one or more desired viewing angles for the avatar, from which the application 150 is to generate the two-dimensional images. At step 1030, the client 170 sends the sprite strip options to the application 150 to configure the application 150 with the sprite strip options. Responsive to subsequent requests from the client 170, the application 150 may generate sprite strips for the client 170 based on the sprite strip options. Accordingly, the sprite strips may be tailored to the needs of a particular client, further improving the performance of the client at least in some cases. After the step 1030, the method 1000 terminates.

Advantageously, embodiments of the invention provide techniques for generating a sprite strip for a three-dimensional avatar in a virtual world. One embodiment provides a virtual world server application. The application receives, from a client, a request specifying customizations to the three-dimensional avatar in the virtual world. In response, the application generates the sprite strip for the three-dimensional avatar based on the specified customizations, the sprite strip containing multiple two-dimensional images of the three-dimensional avatar from different viewing angels. The application then sends the sprite strip to the client for display. The client may then select one or more of the two-dimensional images for display, without having to render the three-dimensional avatar. Accordingly, performance of the client may be improved at least in some cases. For example, the client application may support a broader range of client system specifications using the techniques disclosed herein. The client application may also support a higher frame rate and/or operate with a heightened level of responsiveness.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving, from a first client, a first request specifying to customize a first 3D avatar to include one or more desired visual aspects;
   generating the customized 3D avatar based on the first 3D avatar and the one or more desired visual aspects;
   generating a plurality of 2D views of the customized 3D avatar, based on rendering the customized 3D avatar and by operation of one or more computer processors, each 2D view representing solely the customized 3D avatar in its entirety and from a respective, distinct viewing angle;
   sending the plurality of 2D views to the first client, wherein the first client is configured to generate, based on the plurality of 2D views and user input controlling movement of the customized 3D avatar in a virtual world of a computer game, and without having to render the customized 3D avatar, an animation of the customized 3D avatar in the virtual world, the animation including each 2D view, thereby avoiding a processing cost associated with client rendering of the customized 3D avatar;
   generating a data structure that identifies the customized 3D avatar and that includes the plurality of 2D views, wherein the data structure is stored;
   receiving, from a second client different from the first client, a second request specifying to customize a second 3D avatar to include at least one desired visual aspect; and
   upon determining that the second 3D avatar, customized to include the at least one desired visual aspect, is visually identical to the customized 3D avatar, retrieving the plurality of 2D views from the data structure, wherein the plurality of 2D views is sent to the second client without having to re-render the customized 3D avatar;
   wherein multiple copies of the data structure are stored on a plurality of view servers spread across different geographic regions, wherein the first client is designated to receive the plurality of 2D views from a first view server of the plurality of view servers based on the first client being most geographically proximate to the first view server, in order to improve scalability of and reduce latency associated with the virtual world.

2. The computer-implemented method of claim 1, wherein at least one of the plurality of 2D views is selected from a raster graphics image and a vector graphics image.

3. A non-transitory computer-readable medium containing a program which, when executed, performs an operation comprising:
   receiving, from a first client, a first request specifying to customize a first 3D avatar to include one or more desired visual aspects;
   generating the customized 3D avatar based on the first 3D avatar and the one or more desired visual aspects;
   generating a plurality of 2D views of the customized 3D avatar, based on rendering the customized 3D avatar and by operation of one or more computer processors when executing the program, each 2D view representing solely the customized 3D avatar in its entirety and from a respective, distinct viewing angle;
   sending the plurality of 2D views to the first client, wherein the first client is configured to generate, based on the plurality of 2D views and user input controlling movement of the customized 3D avatar in a virtual world of a computer game, and without having to render the customized 3D avatar, an animation of the customized 3D avatar in the virtual world, the animation including each 2D view, thereby avoiding a processing cost associated with client rendering of the customized 3D avatar;
   generating a data structure that identifies the customized 3D avatar and that includes the plurality of 2D views, wherein the data structure is stored;
   receiving, from a second client different from the first client, a second request specifying to customize a second 3D avatar to include at least one desired visual aspect; and
   upon determining that the second 3D avatar, customized to include the at least one desired visual aspect, is visually identical to the customized 3D avatar, retrieving the plurality of 2D views from the data structure, wherein the plurality of 2D views is sent to the second client without having to re-render the customized 3D avatar;
   wherein multiple copies of the data structure are stored on a plurality of view servers spread across different geographic regions, wherein the first client is designated to receive the plurality of 2D views from a first view server of the plurality of view servers based on the first client being most geographically proximate to the first view server, in order to improve scalability of and reduce latency associated with the virtual world.

4. The non-transitory computer-readable medium of claim 3, wherein at least one of the plurality of 2D views is selected from a raster graphics image and a vector graphics image.

5. A system, comprising:
   one or more computer processors; and
   a memory containing a program, which when executed by the one or more computer processors is configured to perform an operation comprising:
   receiving, from a first client, a first request specifying to customize a first 3D avatar to include one or more desired visual aspects;
   generating the customized 3D avatar based on the first 3D avatar and the one or more desired visual aspects;
   generating a plurality of 2D views of the customized 3D avatar, based on rendering the customized 3D avatar, each 2D view representing solely the customized 3D avatar in its entirety and from a respective, distinct viewing angle;
   sending the plurality of 2D views to the first client, wherein the first client is configured to generate, based on the plurality of 2D views and user input controlling movement of the customized 3D avatar in a virtual world of a computer game, and without having to render the customized 3D avatar, an animation of the customized 3D avatar in the virtual world, the animation including each 2D view, thereby avoiding a processing cost associated with client rendering of the customized 3D avatar;
   generating a data structure that identifies the customized 3D avatar and that includes the plurality of 2D views, wherein the data structure is stored;

receiving, from a second client different from the first client, a second request specifying to customize a second 3D avatar to include at least one desired visual aspect; and upon determining that the second 3D avatar, customized to include the at least one desired visual aspect, is visually identical to the customized 3D avatar, retrieving the plurality of 2D views from the data structure, wherein the plurality of 2D views is sent to the second client without having to re-render the customized 3D avatar;

wherein multiple copies of the data structure are stored on a plurality of view servers spread across different geographic regions, wherein the first client is designated to receive the plurality of 2D views from a first view server of the plurality of view servers based on the first client being most geographically proximate to the first view server, in order to improve scalability of and reduce latency associated with the virtual world.

6. The system of claim 5, wherein the first client is configured to specify at least one of a desired count of 2D views to generate and a desired resolution of the 2D views to generate.

7. The system of claim 5, wherein in a first instance, each 2D view is a raster graphics image, wherein in a second instance, each 2D view is a vector graphics image, wherein movement of the first 3D avatar is controlled based on user input from a user of the customized 3D avatar, wherein the first client is further configured to simulate display of a third customized 3D avatar without rendering the third customized 3D avatar, wherein movement of the third customized 3D avatar is controlled by a second user and not by the user of the customized 3D avatar, wherein the second user uses a client other than the first client.

8. The system of claim 7, wherein the first client is further configured to:
provide a user-selectable option of whether to render the customized 3D avatar or to simulate client rendering of the customized 3D avatar;
upon determining that the user-selectable option specifies to render the customized 3D avatar, generate, based on user input controlling movement of the customized 3D avatar in the virtual world, a client-rendered animation of the customized 3D avatar by performing client rendering of the customized 3D avatar and without using any of the plurality of 2D views; and
upon determining that the user-selectable option specifies to simulate client rendering of the customized 3D avatar, generate, based on user input controlling movement of the customized 3D avatar in the virtual world, a server-rendered animation of the customized 3D avatar, based on the plurality of 2D views and without client rendering of the customized 3D avatar, thereby simulating client rendering of the customized 3D avatar, wherein the server-rendered animation of the customized 3D avatar supports fewer viewing angles than the client-rendered animation of the customized 3D avatar.

9. The system of claim 8, wherein generating the server-rendered animation comprises:
receiving, by the first client, the plurality of 2D views from a server, wherein the plurality of 2D views are generated by the server and based on performing server rendering of the customized 3D avatar; and
generating an animation of the customized 3D avatar by the first client, based on the received plurality of 2D views and without having to perform any client rendering of the customized 3D avatar, an animation of the customized 3D avatar in the virtual world of the computer game, thereby avoiding a processing cost associated with client rendering of the customized 3D avatar.

10. The system of claim 9, wherein the system comprises a server system, wherein the first client executes on a client system and is further configured to:
automatically set the user-selectable option to simulate client rendering of the customized 3D avatar, upon determining that the client system does not meet a minimum predefined threshold of system metrics;
automatically set the user-selectable option to perform client rendering of the customized 3D avatar, upon determining that the client system meets the minimum predefined threshold of system metrics; and
automatically adjust, based on real-time system metrics of the client system, each view option selected from a desired count of 2D views to generate, a desired resolution of the 2D views to generate, a desired compression quality of the 2D views to generate, and a desired view criterion that the 2D views are to satisfy.

11. The system of claim 10, wherein the first client is further configured to:
automatically determine whether one or more system metrics of the client system satisfy the minimum predefined threshold, wherein the minimum predefined threshold pertains to an amount of main memory in the computer, a type of main memory in the computer, a type of graphics card in the computer, an amount of graphics memory in the computer, a type of processor in the computer, a clock speed of the processor in the computer, and respective results from a plurality of distinct benchmarks executed on the computer.

12. The system of claim 11, wherein the virtual world includes an environment, wherein the plurality of 2D views does not depict any visual aspect of the environment, wherein the user-selectable option pertains only to avatar rendering and not to environment rendering, wherein the first client is further configured to render the environment independent of the user-selectable option, wherein the first client is further configured to specify, to the server, each view option selected from the desired count of 2D views, the desired resolution of the 2D views, the desired compression quality of the 2D views, and the desired view criterion, wherein each view option is, in a third instance, user-specified and, in a fourth instance, automatically determined based on the one or more system metrics.

13. The system of claim 12, wherein the server is configured to generate the plurality of 2D views based further on the desired count of 2D views, the desired resolution of the 2D views, the desired compression quality of the 2D views, and the desired view criterion, such that the plurality of 2D views is equal in count of the desired count of 2D views, and such that each 2D view in the plurality of 2D views is of the desired resolution, reflects the desired compression quality, and satisfies the desired view criterion, wherein automatically determining comprises programmatically determining without requiring any user input.

* * * * *